United States Patent
Kim et al.

(10) Patent No.: US 12,483,684 B2
(45) Date of Patent: Nov. 25, 2025

(54) SYSTEM AND METHOD OF DETECTING MULTIVIEW FILE FORMAT

(71) Applicant: LEIA INC., Menlo Park, CA (US)

(72) Inventors: Chelhwon Kim, Palo Alto, CA (US); Yiwen Hua, Foster City, CA (US); David A. Fattal, Mountain View, CA (US)

(73) Assignee: LEIA SPV LLC, Menlo Park, CA (US)

( * ) Notice: Subject to any disclaimer, the term of this patent is extended or adjusted under 35 U.S.C. 154(b) by 18 days.

(21) Appl. No.: 18/234,320

(22) Filed: Aug. 15, 2023

(65) Prior Publication Data

US 2023/0396753 A1    Dec. 7, 2023

Related U.S. Application Data

(63) Continuation of application No. PCT/US2021/031451, filed on May 8, 2021.
(Continued)

(51) Int. Cl.
*H04N 13/139* (2018.01)
*H04N 13/32* (2018.01)

(52) U.S. Cl.
CPC ........... *H04N 13/139* (2018.05); *H04N 13/32* (2018.05); *H04N 2213/007* (2013.01)

(58) Field of Classification Search
None
See application file for complete search history.

(56) References Cited

U.S. PATENT DOCUMENTS

| 9,185,400 B2 | 11/2015 | Hrebien |
| 2012/0294486 A1 | 11/2012 | Diggins et al. |

(Continued)

FOREIGN PATENT DOCUMENTS

| CA | 3209736 | 9/2022 |
| CN | 102231829 | 12/2014 |

(Continued)

OTHER PUBLICATIONS

International Search Report and Written Opinion (ISRWO) by International Searching Authority (ISA) Korean Intellectual Property Office (KIPO) dated Nov. 10, 2021 (9 pages) for foreign counterpart parent International Application No. PCT/US2021/031451.

(Continued)

*Primary Examiner* — Benjamin R Bruckart
*Assistant Examiner* — Charles N Hicks
(74) *Attorney, Agent, or Firm* — Schwegman, Lundberg & Woessner, P.A.

(57) ABSTRACT

Systems and methods are directed to multiview format detection. A multiview image that comprises a plurality of tiled view images is accessed. A cross-correlation map from the multiview image may be generated by autocorrelating the multiview image with a shifted copy of the multiview image. The cross-correlation map may be sampled at a plurality of predefined locations of the cross-correlation map to identify a set of cross-correlation values. A multiview format of the multiview image may be detected by classifying a feature set of the multiview image that comprises the set of cross-correlation values. The multiview image may be configured to be rendered on a multiview display based on the multiview format.

20 Claims, 8 Drawing Sheets

Related U.S. Application Data

(60) Provisional application No. 63/153,917, filed on Feb. 25, 2021.

(56) References Cited

U.S. PATENT DOCUMENTS

| | | | |
|---|---|---|---|
| 2013/0242051 A1* | 9/2013 | Balogh | H04N 19/436 348/43 |
| 2014/0132743 A1* | 5/2014 | Shin | H04N 13/161 348/51 |
| 2017/0085859 A1 | 3/2017 | Bruls | |
| 2017/0199420 A1 | 7/2017 | Shin et al. | |
| 2017/0359577 A1* | 12/2017 | Park | H04N 19/51 |
| 2018/0300903 A1 | 10/2018 | Gierach et al. | |
| 2019/0205622 A1 | 7/2019 | Hong | |
| 2022/0383465 A1* | 12/2022 | Dahlquist | G06T 11/00 |
| 2023/0030728 A1 | 2/2023 | Dahlquist | |

FOREIGN PATENT DOCUMENTS

| | | |
|---|---|---|
| CN | 116888957 | 10/2023 |
| EP | 4298789 | 1/2024 |
| JP | 2013104963 | 5/2013 |
| JP | 2024509782 | 3/2024 |
| KR | 20170084539 | 7/2017 |
| KR | 20180120270 | 11/2018 |
| KR | 20200051338 | 5/2020 |
| KR | 20230131899 | 9/2023 |
| TW | 202249482 | 12/2022 |
| TW | 1830147 | 1/2024 |
| WO | 2020222770 | 11/2020 |
| WO | 2022108609 A1 | 5/2022 |
| WO | 2022125128 A1 | 6/2022 |
| WO | 2022173611 A1 | 8/2022 |
| WO | 2022182368 A1 | 9/2022 |
| WO | 2022182369 A1 | 9/2022 |
| WO | 2022182376 | 9/2022 |
| WO | 2023014576 A1 | 2/2023 |
| WO | 2023129214 A1 | 7/2023 |

OTHER PUBLICATIONS

"Korean Application Serial No. 10-2023-7027192, Response filed Aug. 16, 2024 to Office Action mailed Jul. 2, 2024", w current English claims, 16 pgs.

"Japanese Application Serial No. 2023-551667, Notification of Reasons for Refusal mailed Aug. 20, 2024", w English translation, 10 pgs.

"European Application Serial No. 21928312.4, Response to Communication pursuant to Rules 161(2) and 162 EPC filed Mar. 1, 2024", 20 pgs.

"International Application Serial No. PCT US2021 031451, International Preliminary Report on Patentability mailed Sep. 7, 2023", 6 pgs.

"Canadian Application Serial No. 3209736, Voluntary Amendment filed Jul. 26, 2023", 28 pgs.

"Taiwanese Application Serial No. 111105673, Office Action mailed Feb. 22, 2022", w English Translation, 7 pgs.

"Taiwanese Application Serial No. 111105673, Office Action mailed Jun. 15, 2022", w English Translation, 6 pgs.

"Taiwanese Application Serial No. 111105673, Office Action mailed Aug. 24, 2022", w English Translation, 4 pgs.

"Taiwanese Application Serial No. 111105673, Office Action mailed Mar. 8, 2023", w English Translation, 27 pgs.

"Taiwanese Application Serial No. 111105673, Response filed May 31, 2023 to Office Action mailed Mar. 8, 2023", w English Translation, 21 pgs.

"Korean Application Serial No. 10-2023-7027192, Office Action mailed Jul. 2, 2024", w English Translation, 11 pgs.

"Japanese Application Serial No. 2023-551667, Decision of Rejection mailed Dec. 3, 2024", w English Translation, 7 pgs.

"European Application Serial No. 219283124, Extended European Search Report mailed Dec. 4, 2024", 11 pgs.

"Japanese Application Serial No. 2023-551667, Response filed Nov. 15, 2024 to Notification of Reasons for Refusal mailed Aug. 20, 2024", w English claims, 16 pgs.

"Canadian Application Serial No. 3,209,736, Examiners Rule 86(2) Report mailed Nov. 20, 2024", 4 pgs.

"Canadian Application Serial No. 3,209,736, Response filed Mar. 19, 2025 to Examiners Rule 86(2) Report mailed Nov. 20, 2024", 6 pgs.

"European Application Serial No. 21928312.4, Response filed May 7, 2025 to Extended European Search Report mailec Dec. 4, 2024", 15 pgs.

"Korean Application Serial No. 10-2023-7027192, Notice of Preliminary Rejection mailed Apr. 29, 2025", w English translation, 11 pgs.

"Korean Application Serial No. 10-2023-7027192, Response filed Jun. 5, 2025 to Notice of Preliminary Rejection mailed Apr. 29, 2025", w English Claims, 21 pgs.

* cited by examiner

SYSTEM AND METHOD OF DETECTING MULTIVIEW FILE FORMAT

CROSS-REFERENCE TO RELATED APPLICATIONS

This application is a continuation patent application of and claims priority to International Application No. PCT/US2021/031451, filed May 8, 2021, which claims the benefit of priority to U.S. Provisional Application No. 63/153,917, filed on Feb. 25, 2021, the entirety of each of which is incorporated by reference herein.

STATEMENT REGARDING FEDERALLY SPONSORED RESEARCH OR DEVELOPMENT

N/A

BACKGROUND

Multiview displays are an emerging display technology that provide a more immersive viewing experience compared to conventional 2D content. Multiview content may include still images or a series of video frames, where each multiview image (e.g., picture or frame) contains different views of a scene. End devices that receive and process multiview content are responsible for converting the received multiview content into a native or local format so that it can be displayed on the end device. Multiview content may be received from a variety of sources.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide techniques to detect a multiview format of a multiview image to allow a multiview display system to properly process and render the multiview image. Multiview image files may arrange view images in a variety of formats. An end device that is tasked with processing, rendering, and displaying the multiview image may require information about how the view images are arranged. Relying on a user to manually specify the multiview format may be disruptive to workflows that render multiview images. In addition, generally automating the process may lead to inaccurate results, particularly for images that have repetitive patterns or textures. Embodiments are directed to automatically detecting the multiview format by extracting features of the multiview image and classifying the features. The results of such embodiments may provide for highly accurate, autonomous multiview format classification. For example, in some embodiments, one feature may be a set of cross-correlation values. The cross-correlation values are determined by performing an auto-correlation operation on the multiview image to generate a cross-correlation map. The cross-correlation map is a matrix that may be visualized as an image that represents the location of repetitions within the multiview image. The cross-correlation map may be sampled at predefined locations to generate a feature based on cross-correlation values. Other features may be extracted from the multiview image including, for example, the aspect ratio. A classifier is trained on classifying multiview images with this feature set to then detect multiview formats during runtime.

Figure 1:
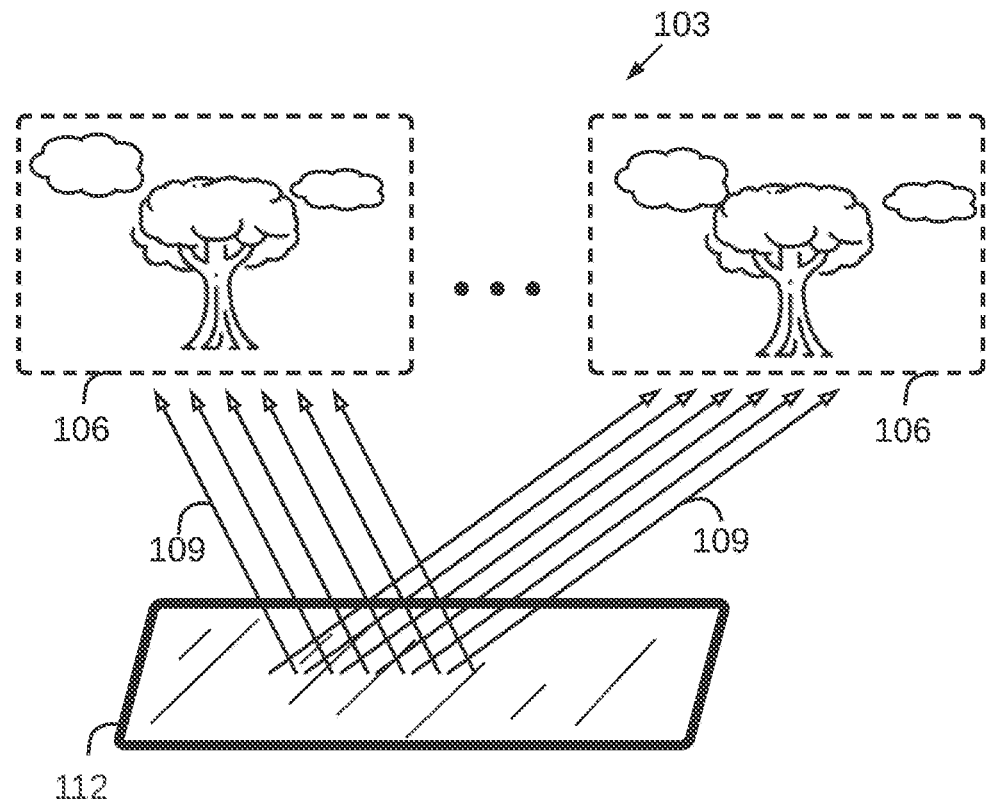
FIG. 1 illustrates a multiview image in an example, according to an embodiment consistent with the principles described herein.

FIG. 1 illustrates a multiview image in an example, according to an embodiment consistent with the principles described herein. A multiview image 103 may be a static picture or a video frame from a multiview video stream. The multiview image 103 has a plurality of view images 106 (e.g., views). Each of the view images 106 corresponds to a different principle angular direction 109 (e.g., a left view, a right view, etc.). The view images 106 are rendered on a multiview display 112. Each view image 106 represents a different viewing angle of a scene of the multiview image 103. The different view images 106 therefore have some level of disparity with respect to one another. A viewer may perceive one view image 106 with her right eye while perceiving a different view image 106 with her left eye. This allows a viewer to perceive different view images 106 contemporaneously, thereby experiencing a three-dimensional (3D) effect.

In some embodiments, as a viewer physically changes her viewing angle with respect to the multiview display 112, the eyes of the viewer may catch different views of the multiview image 103. As a result, the viewer may interact with the multiview display 112 to see different view images 106 of the multiview image 103. For example, as the viewer moves to the left, the viewer may see more of the left side of the scene in the multiview image 103. The multiview image 103 may have multiple view images 106 along a horizontal plane or have multiple view images 106 along the vertical plane, or both. Thus, as a user changes the viewing angle to see different view images 106, the viewer may gain additional visual details of the scene expressed in the multiview image 103.

As discussed above, each view image 106 is presented by the multiview display 112 at different, corresponding principal angular directions 109. When presenting the multiview image 103 for display, the view images 106 may actually appear on or in a vicinity of the multiview display 112. In this respect, rendered multiview content may be referred to as a lightfield content. A characteristic of observing lightfield content is the ability to contemporaneously observe different views. Lightfield content contains visual imagery that may appear in front of the screen as well as behind the screen so as to convey a sense of depth to the viewer.

A 2D display may be substantially similar to the multiview display 112, except that the 2D display is generally configured to provide a single view (e.g., only one of the views) as opposed to the different views of the multiview image 103. Herein a 'two-dimensional display' or '2D display' is defined as a display configured to provide a view of an image that is substantially the same regardless of a direction from which the image is viewed (i.e., within a predefined viewing angle or range of the 2D display). A conventional liquid crystal display (LCD) found in many smart phones and computer monitors are examples of 2D displays. In contrast herein, a 'multiview display' is defined as an electronic display or display system configured to provide different views of a multiview image in or from different view directions contemporaneously from the perspective of the user. In particular, the different view images 106 may represent different perspective views of a multiview image 103.

The multiview display 112 may be implemented using a variety of technologies that accommodate the presentation of different image views so that they are perceived contemporaneously. One example of a multiview display is one that employs multibeam elements that scatter light to control the principle angular directions of the different view images 106. According to some embodiments, the multiview display 112 may be a lightfield display, which is one that presents a plurality of light beams of different colors and different directions corresponding to different views. In some examples, the lightfield display is a so-called 'glasses free' three-dimensional (3-D) display that may use multibeam elements (e.g., diffractive gratings) to provide autostereoscopic representations of multiview images without the need to wear special eyewear to perceive depth.

Figure 2:
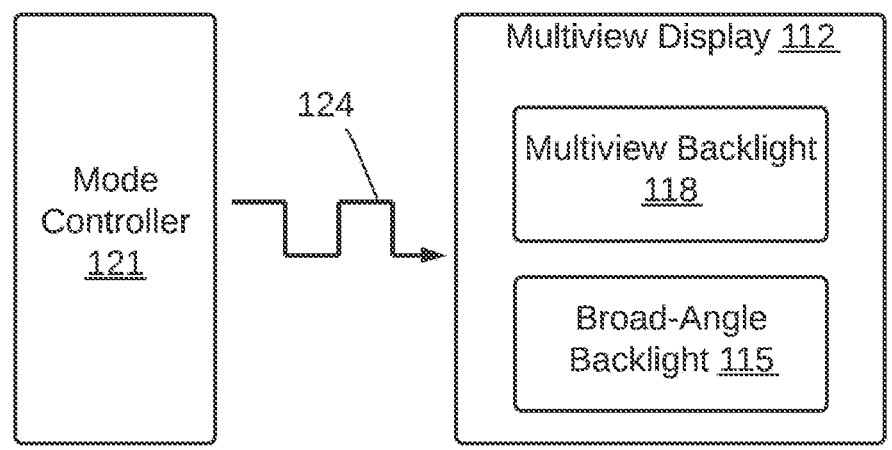
FIG. 2 illustrates an example of a multiview display, according to an embodiment consistent with the principles described herein.

FIG. 2 illustrates an example of a multiview display, according to an embodiment consistent with the principles described herein. A multiview display 112 may generate lightfield content when operating in a multiview mode. In some embodiments, the multiview display 112 renders multiview images as well as 2D images depending on its mode of operation. For example, the multiview display 112 may include a plurality of backlights to operate in different modes. The multiview display 112 may be configured to provide broad-angle emitted light during a 2D mode using a broad-angle backlight 115. In addition, the multiview display 112 may be configured to provide directional emitted light during a multiview mode using a multiview backlight 118 having an array of multibeam elements, the directional emitted light comprising a plurality of directional light beams provided by each multibeam element of the multibeam element array. In some embodiments, the multiview display 112 may be configured to time multiplex the 2D mode and the multiview mode using a mode controller 121 to sequentially activate the broad-angle backlight 115 during a first sequential time interval corresponding to the 2D mode and the multiview backlight 118 during a second sequential time interval corresponding to the multiview mode. Directions of directional light beams of the directional light beam may correspond to different view directions of a multiview image 103. The mode controller 121 may generate a mode selection signal 124 to activate the broad-angle backlight 115 or multiview backlight 118.

In 2D mode, the broad-angle backlight 115 may be used to generate images so that the multiview display 112 operates like a 2D display. By definition, 'broad-angle' emitted light is defined as light having a cone angle that is greater than a cone angle of the view of a multiview image or multiview display. In particular, in some embodiments, the broad-angle emitted light may have a cone angle that is greater than about twenty degrees (e.g., >±20°). In other embodiments, the broad-angle emitted light cone angle may be greater than about thirty degrees (e.g., >±30°), or greater than about forty degrees (e.g., >±40°), or greater than about fifty degrees (e.g., >±50°). For example, the cone angle of the broad-angle emitted light may be greater than about sixty degrees (e.g., >±60°).

The multiview mode may use a multiview backlight 118 instead of a broad-angle backlight 115. The multiview backlight 118 may have an array of multibeam elements on a top or bottom surface that scatter light as plurality of directional light beams having principal angular directions that differ from one another. For example, if the multiview display 112 operates in a multiview mode to display a multiview image having four views, the multiview backlight 118 may scatter light into four directional light beams, each directional light beam corresponding to a different view. A mode controller 121 may sequentially switch between 2D mode and multiview mode so that a multiview image is displayed in a first sequential time interval using the multiview backlight and a 2D image is displayed in a second sequential time interval using the broad-angle backlight. The directional light beams may be at predetermined angles, where each directional light beam corresponds to a different view of the multiview image.

In some embodiments, each backlight of the multiview display 112 is configured to guide light in a light guide as guided light. Herein, a 'light guide' is defined as a structure that guides light within the structure using total internal reflection or 'TIR'. In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide. The light guide may be shaped like a plate or slab. The light guide may be edge lit by a light source (e.g., light emitting device).

In some embodiments, the multiview backlight 118 of the multiview display 112 is configured to scatter out a portion of the guided light as the directional emitted light using multibeam elements of the multibeam element array, each multibeam element of the multibeam element array comprising one or more of a diffraction grating, a micro-refractive element, and a micro-reflective element. In some embodiments, a diffraction grating of a multibeam element may comprise a plurality of individual sub-gratings. In some embodiments, a micro-reflective element is configured to reflectively couple or scatter out the guided light portion as the plurality of directional light beams. The micro-reflective element may have a reflective coating to control the way guided light is scattered. In some embodiments, the multibeam element comprises a micro-refractive element that is configured to couple or scatter out the guided light portion as the plurality of directional light beams by or using refraction (i.e., refractively scatter out the guided light portion).

The multiview display 112 may also include a light valve array positioned above the backlights (e.g., above the broad-angle backlight 115 and above the multiview backlight 118). The light valves of the light valve array may be, for example, liquid crystal light valves, electrophoretic light valves, light valves based on or employing electrowetting, or any combination thereof. When operating in 2D mode, the broad-angle backlight 115 emits light towards the light valve array. This light may be diffuse light emitted at a broad angle. Each light valve is controlled to achieve a particular pixel valve to display a 2D image as it is illuminated by light emitted by the broad-angle backlight 115. In this respect, each light valve corresponds to a single pixel. A single pixel, in this respect, may include different color pixels (e.g., red, green blue) that make up a single pixel cell (e.g., LCD cell).

When operating in multiview mode, the multiview backlight 118 emits directional light beams to illuminate the light valve array. Light valves may be grouped together to form a multiview pixel. For example, in a four-view multiview format, a multiview pixel may comprise four different pixels, each corresponding to a different view. Each pixel in a multiview pixel may further comprise different color pixels.

Each light valve in a multiview pixel arrangement may be illuminated by one of the light beams having a principle angular direction. Thus, a multiview pixel is a pixel grouping that provides different views of a pixel of a multiview image. In some embodiments, each multibeam element of the multiview backlight 118 is dedicated to a multiview pixel of the light valve array.

The multiview display 112 comprises a screen to display a multiview image 103. The screen may be a display screen of a telephone (e.g., mobile telephone, smart phone, etc.), a tablet computer, a laptop computer, a computer monitor of a desktop computer, a camera display, or an electronic display of substantially any other device, for example.

As used herein, the article 'a' is intended to have its ordinary meaning in the patent arts, namely 'one or more'. For example, 'a processor' means one or more processor and as such, 'the memory' means 'one or more memory components' herein.

Figure 3:
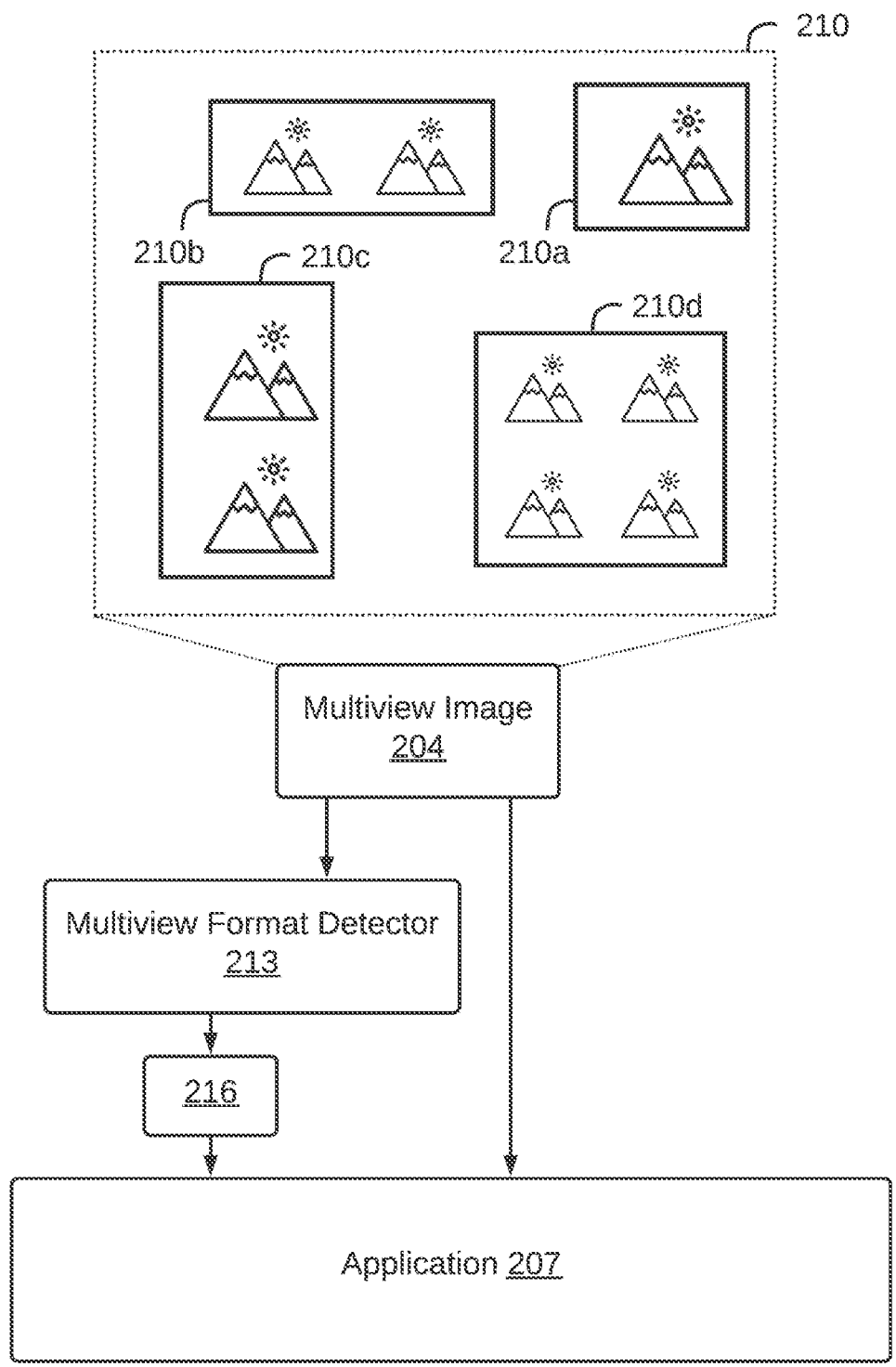
FIG. 3 illustrates an example of accessing a multiview image comprising a plurality of tiled view images, according to an embodiment consistent with the principles described herein.

FIG. 3 illustrates an example of accessing a multiview image comprising a plurality of tiled view images, according to an embodiment consistent with the principles described herein. FIG. 3 depicts an example of multiview format detection by accessing a multiview image 204 comprising a plurality of tiled view images. The multiview image 204 may be similar to the multiview image 103 of FIGS. 1 and 2. The multiview image 204 may be formatted as a file or otherwise contained in a file. The multiview image 204 may be received from a source such as, for example, a remote server, a streaming service, a repository, or a local application. A multiview display system may be configured to process and render the multiview image 204 for display. For example, the multiview display system may execute an application 207 that causes the display of the multiview image 204. The application 207 may be a media player application, a video game, a social media application, or any other application that displays multiview content. A view image is considered to be tiled as it is placed adjacent to another view image in a tiled configuration. Thus, the multiview image is formatted so that it arranges each view image as a grid of tiles along the horizontal direction, vertical direction, or both.

The multiview image 204 may include one or more view images that are organized in a tiled arrangement. A multiview format refers to the number of view images as well as the way the view images are spatially arranged as tiles. In this respect, the multiview image 204 may be visualized as a 2D image with the various view images formed as array of tiles, each tile corresponding to a different view image. The multiview image 204 therefore is arranged according to a particular multiview format 210. FIG. 3 depicts different examples of multiview formats. A first multiview format shown is a single tile format 210a (e.g., single view image). The single tile format 210a contains a single view (e.g., one tile) and is therefore not a true multiview image. However, embodiments are directed to distinguishing the single tile format from other multiview formats 210 having multiple tiles. A second multiview format shown is a 2-by-1 tile format 210b. The 2-by-1 tile format may also be referred to as a side-by-side format where two different view images are arranged side-by-side along the horizontal direction. The 2-by-1 tile format 210b may be used so that one view image is intended for the left eye while the other view image is intended for the right eye. As mentioned above, multiview images 204 contain different views of the same scene where the separate view images are mostly similar, but with some level of disparity. A third multiview format shown is a 1-by-2 tile format 210c. The 1-by-2 tile format 210c also contains two different view images but are arranged adjacently along the vertical direction. A fourth multiview format shown is a 2-by-2 tile format 210d. The 2-by-2 tile format 210d contains four different view images arranged with two tiles in the horizontal direction and two tiles arranged in the vertical direction. The 2-by-2 tile format 210d may also be referred to as a quad format.

The multiview image 204 may conform to one of the various types multiview formats 210 having any number of tiles in any variety of arrangements (e.g., a 1-by-4 tile format, a 4-by-1 tile format, an eight-view format, etc.). The application 207 may be unaware of the type of multiview format 210 of the multiview image 204. Embodiments are directed to a multiview format detector 213 that may be used to analyze the multiview image 204 and detect the multiview format 210 of the multiview image 204. The multiview format detector 213 may generate a multiview format label 216 indicating the multiview format 210 of the multiview image. The application 207 may render or otherwise process the multiview image 204 using the multiview format label 216. This allows the application 207 to process multiview images 204 with initially unspecified or unknown multiview formats 210.

The multiview format detector 213 begins by accessing a multiview image comprising a plurality of tiled view images. The multiview image 204 may be accessed from memory or otherwise provided by a source that sends the multiview image 204 to an application 207 executing in the multiview display system.

Figure 4:
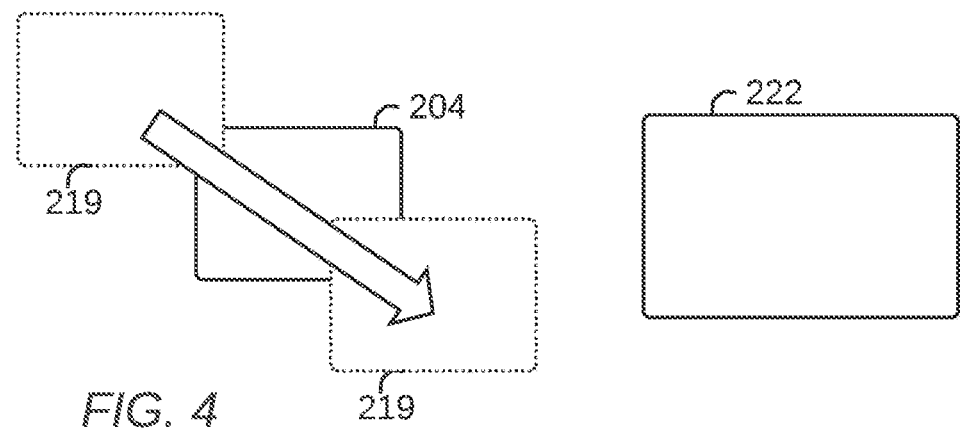
FIG. 4 illustrates an example of generating a cross-correlation map from the multiview image according to an embodiment consistent with the principles described herein.

FIG. 4 illustrates an example of generating a cross-correlation map from the multiview image 204 according to an embodiment consistent with the principles described herein. For example, upon accessing the multiview image 204, the multiview format detector 213 may perform operations that include generating a cross-correlation map from the multiview image by autocorrelating the multiview image with a shifted copy of the multiview image. FIG. 4 shows an auto-correlation operation where the multiview image 204 is correlated with a shifted copy 219 of the multiview image (e.g., auto-correlated). The shifted copy 219 may convolve or otherwise slide in the horizontal and in the vertical directions over the multiview image 204 as part of the auto-correlation process. The auto-correlation process may involve a dot product calculation between a portion of the shifted copy 219 and the multiview image 204. The auto-correlation operation may occur in the pixel-domain or the frequency domain. The auto-correlation operation produces a cross-correlation map 222. The cross-correlation map 222 may be a two-dimensional matrix of elements. The cross-correlation map 222 may be represented or otherwise visualized as an image, where each pixel value contains a cross-correlation value for a given position of the shifted copy 219 relative to the multiview image 204.

Figure 5:
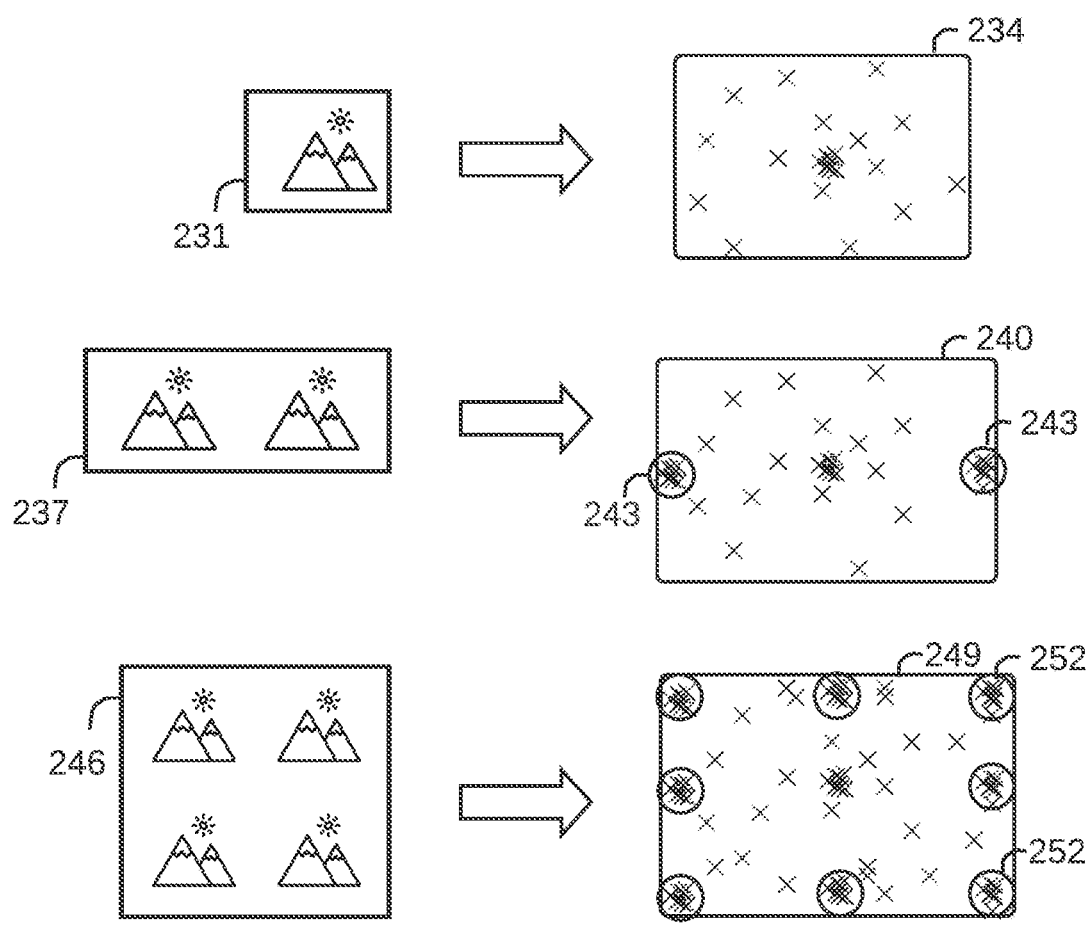
FIG. 5 illustrates an example of various cross-correlation maps generated from different multiview formats, according to an embodiment consistent with the principles described herein.

FIG. 5 illustrates an example of various cross-correlation maps generated from different multiview formats, according to an embodiment consistent with the principles described herein. A multiview image 231 having a single tile format may result in a cross-correlation map 234. As shown in FIG. 5, the cross-correlation map 234 has low cross-correlation values shown as areas with sparse cross-hatching and high cross-correlation values shown as areas with denser cross-hatching. Most of the cross-correlation map has sparse cross-hatching, indicating low levels of cross-correlation at most positions. However, the cross-correlation map 234 has a single hotspot at the center. A hotspot is a region in a cross-correlation map that contains relatively high cross-correlation values. Specifically, the center of the cross-correlation map 234 is dense with cross-hatching, meaning that when the shifted copy 219 is positioned on top of the multiview image 204 (e.g., in the center), there is large cross-correlation. In addition, there is no strong indication of cross-correlation outside of the center of the cross-correlation map 234.

A multiview image 237 having a 2-by-1 tile format may result in a cross-correlation map 240 having a hotspot in the middle as well as two hotspots 243 along the left and right edges. This indicates that there are three strong cross-correlation positions as the shifted copy 219 slides along the horizontal direction.

A multiview image 246 having a 2-by-2 tile format may result in a cross-correlation map 249 having a hotspot in the middle as well as several hotspots along the left and right edges and hotspots 252 along the corners. This indicates that there are strong cross-correlation values at these regions as the shifted copy 219 slides along both the horizontal direction and the vertical direction.

Figure 6:
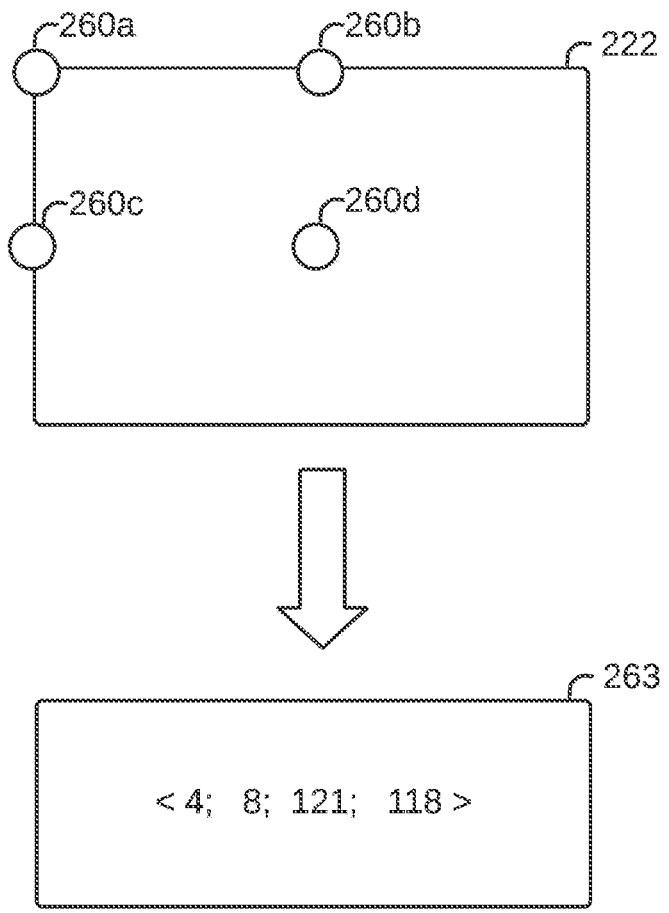
FIG. 6 illustrates an example of sampling the cross-correlation map, according to an embodiment consistent with the principles described herein.

FIG. 6 illustrates an example of sampling the cross-correlation map, according to an embodiment consistent with the principles described herein. For example, upon generating a cross-correlation map 222, the multiview format detector 213 may perform operations that include sampling the cross-correlation map at a plurality of predefined locations of the cross-correlation map to identify a set of cross-correlation values. FIG. 6 shows predefined locations 260a-d that have specific coordinates on the cross-correlation map 222. In some embodiments, at least one of the predefined locations comprises a corner region (e.g., predefined location 260a) of the cross-correlation map. In some embodiments, at least one of the predefined locations comprises a midpoint (e.g., predefined locations 260b, 260c) along the length or width of the cross-correlation map 222. Sampling at a corner may allow for the detection of vertically oriented tiles while sampling at a midpoint may allow for the detection of horizontally oriented tiles. The number of samples may be chosen based on the number of expected view images. For example, more sample points may be used to distinguish between multiview images as the number of potential views increases.

In some embodiments, each of the cross-correlation values is determined based on a single cross-correlation value. For example, sampling the cross-correlation map 222 may involve identifying the value of a single element (e.g., pixel) of the cross-correlation map 222. The predefined location may be a specific x-y coordinate of the cross-correlation map 222. In some embodiments, each of the cross-correlation values is determined by averaging values within a corresponding predefined location. In this example, each predefined location may include a range of x-y coordinate of the cross-correlation map 222. The cross-correlation values within each range may be averaged or otherwise aggregated. Thus, rather than sampling one element that may be at a hotspot, several pixels within the hotspot may be sampled to generate an averaged cross-correlation value.

Once sampled, a set of cross-correlation values 263 is determined. The set of cross-correlation values 263 may be a relatively small array of elements, where each element is a cross-correlation value. The set of cross-correlation values 263 may be used as one feature in a feature set. More samples may be used to detect multiview formats having a larger number of views. In the example of FIG. 6, four samples are taken, each sample corresponding to a respective predefined location 260a-d. Furthermore, in this example, the first cross-correlation value is 4 and it is sampled from the corner region (predefined location 260a). The second cross-correlation value is 8 and it is sampled from the top horizontal midpoint (predefined location 260b). The third cross-correlation value is 121 and it is sampled from the left vertical midpoint (predefined location 260c). The fourth cross-correlation value is 118 and it is sampled from the center (predefined location 260d). This feature of cross-correlation values 263 indicates a likelihood of auto-correlation along the horizontal direction which fits a signature pattern of a 2-by-1 format. Specifically, the first two elements of the cross-correlation values 263 are relatively low indicating low auto-correlation as the shifted copy slides in the vertical direction. The last two elements of the cross-correlation values 263 are relatively high indicating high auto-correlation as the shifted copy slides in the horizontal direction.

Figure 7:
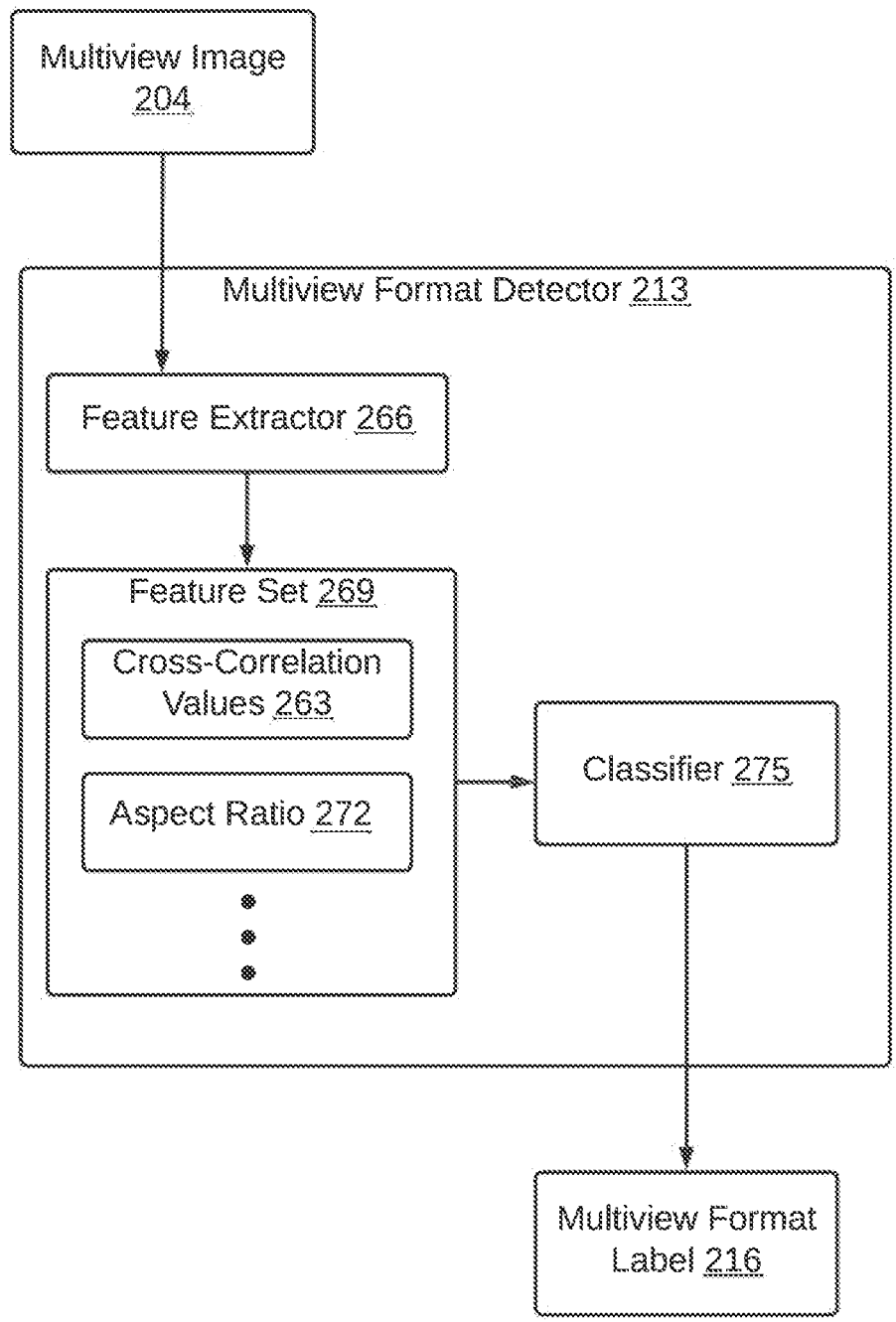
FIG. 7 illustrates an example of detecting a multiview format of the multiview image, according to an embodiment consistent with the principles described herein.

FIG. 7 illustrates an example of detecting a multiview format of the multiview image, according to an embodiment consistent with the principles described herein. For example, upon determining the set of cross-correlation values 263, the multiview format detector 213 may perform operations that include detecting a multiview format of the multiview image by classifying a feature set of the multiview image that comprises the set of cross-correlation values. The multiview format detector 213 may include a feature extractor 266 that extracts features from a multiview image 204 and generates a feature set 269 of the multiview image 204.

As explained above, with respect to FIG. 6, one feature may be the set of cross-correlation values 263. In some embodiments, as illustrated in FIG. 7, the feature extractor 266 may perform other operations that include determining an aspect ratio 272 of the multiview image 204, wherein the feature set 269 further comprises the aspect ratio 272. The aspect ratio 272 may be the ratio of the height and width of the multiview image 204 in terms of pixels. The feature extractor 266 may identify any number of other features that characterize the multiview image 204.

The multiview format detector 213 may include a classifier 275. The classifier 275 may be a support vector machine. In some embodiments, the classifier 275 is trained using training data, wherein the training data comprises a training set of multiview images and corresponding training labels. Feature sets appended with known multiview formats may be inputted into the classifier 275 as training data to train the classifier 275. When training the classifier 275, the training labels may comprise labels indicating a single tile format, a 1-by-2 tile format, a 2-by-1 tile format, and a 2-by-2 tile format. The training data may include any multiview format 210. The classifier 275 may be trained during configuration time and then executed to classify unknown multiview formats of multiview images 204 during runtime.

For example, the training data may include feature vectors along with a label that provides ground truth. The training data may be formatted as a file or table that correlates a particular set of feature values to ground truth. The training data may be inputted in the classifier 275 using an application programming interface, for example. The classifier 275 may use the training data to train the classifier by building classifications or regression models in the form of a tree structure, by separating the training data by class and calculating conditional probabilities for each class, by generating training weights from the training data to be used in convolutional operations, by converting the training data into datapoints in a feature vector space, or by using other training methods of configuring a classifier.

The multiview format detector 213 may input a feature set of the multiview image into a classifier, the feature set comprising the set of cross-correlation values. The classifier 275 is supplied with the feature set 269 extracted from the multiview image 204, where the feature set 269 includes cross-correlation values that are sampled at predefined locations. The classifier 275 generates a multiview format label 216. The application 207 may retrieve a label from the classifier, the label indicating a multiview format of the multiview image. The label may be the multiview format label 216.

Figure 8:
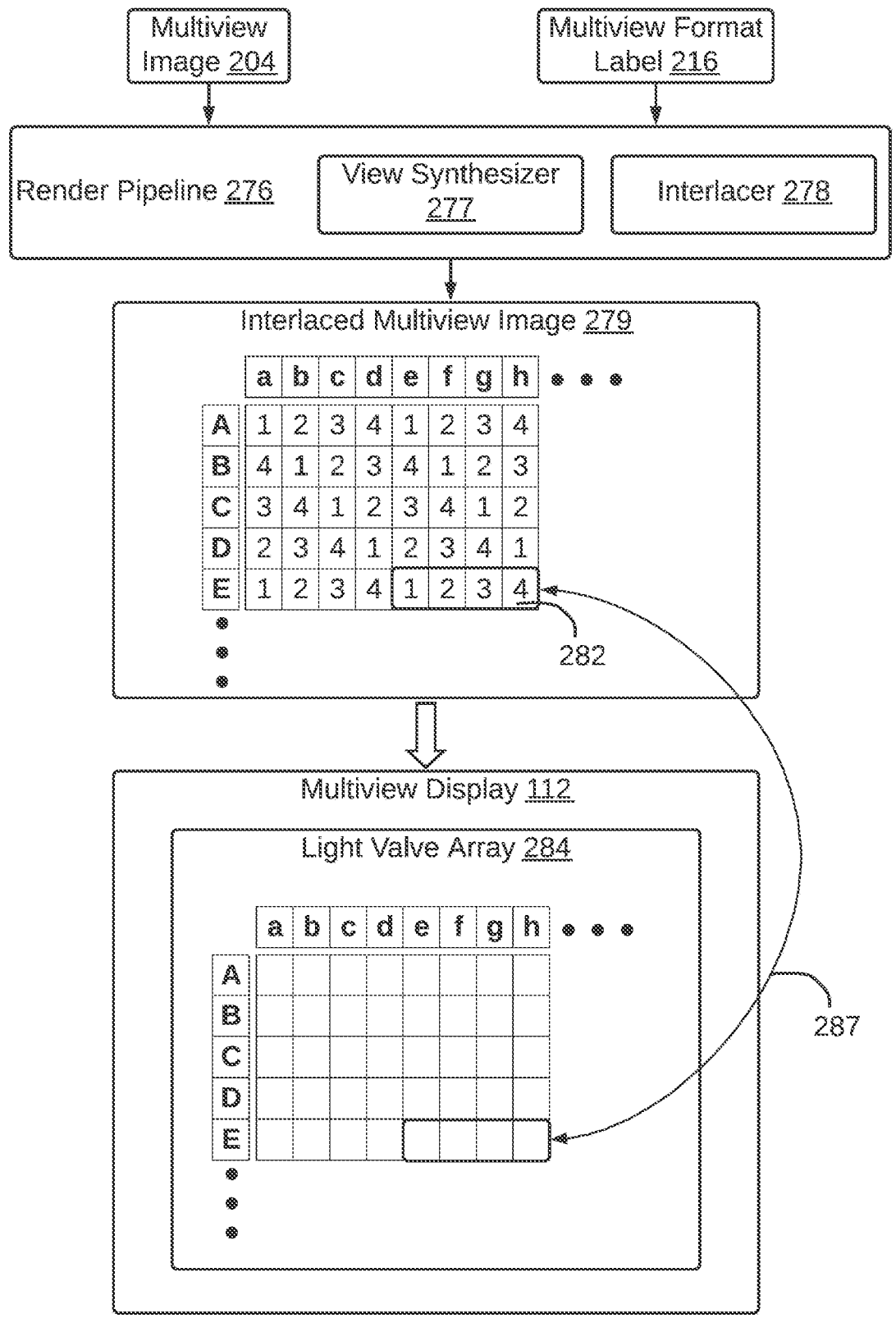
FIG. 8 illustrates an example of rendering the multiview image on a multiview display based on the multiview format, according to an embodiment consistent with the principles described herein.

FIG. 8 illustrates an example of rendering the multiview image on a multiview display based on the multiview format, according to an embodiment consistent with the principles described herein. For example, an application 207 may retrieve a multiview format label 216 to allow it to render the multiview image 204 using the multiview display 112. FIG. 8 provides an example of how an application 207 renders a multiview image 204 using the multiview format label 216. The embodiments shown in FIG. 8 are directed to an application 207 that uses a render pipeline 276 to render the multiview image 204.

The render pipeline 276 may include one or more components that process image content and present it on a display (e.g., multiview display 112). The render pipeline 276 may including components that are executable by a central processing unit (CPU), graphics processing unit (GPU), or any combination thereof. The application 207 may interface with the render pipeline 276 using function calls or an application programming interface (API). In some embodiments, the render pipeline 276 may include a view synthesizer 277, an interlacer 278, or other components that render graphics.

A view synthesizer 277 performs view synthesis to generate a target number of view images from original view images contained in the multiview image 204. For example, if the multiview image 204 contains fewer views than a target number of views that is supported by a multiview display system, the view synthesizer may generate additional view images based on the original view images of the multiview image 204. View synthesis includes operations that interpolate or extrapolate one or more original view images to generate a new view images. View synthesis may involve one or more of forward warping, a depth test, and an in-painting technique to sample nearby regions such as to fill de-occluded regions. Forward warping is an image distortion process that applies a transformation to a source image. Pixels from the source image may be processed in a scanline order and the results are projected onto a target image. A depth test is a process where fragments of an image that are processed or to be processed by a shader have depth values that are tested with respect to a depth of a sample to which it is being written. Fragments are discarded when the test fails. And a depth buffer is updated with the output depth of the fragment when the test passes. In-painting refers to filling in missing or unknown regions of an image. Some techniques involve predicting pixel vales based on nearby pixels or reflecting nearby pixels onto an unknown or missing region. Missing or unknown regions of an image may result from scene de-occlusion, which refers to a scene object that is partially covered by another scene object. In this respect, re-projection may involve image processing techniques to construct a new perspective of a scene from an original perspective. View images may be synthesized using a trained neural network. In addition, the view synthesizer 277 may generate additional view images using a depth map of the multiview image. A depth map may be a file or image that indicates a depth for each pixel in a particular view image.

The render pipeline 276 may also include an interlacer 278 (e.g., an interlacing program, an interlacing shader, etc.). The interlacer 278 may be configured to interlace the pixels of the tiled view images of the multiview image (along with any synthesized view images). The interlacer 278 may be a graphics shader and may be part of the application 207 or otherwise invoked by the application 207.

The multiview format label 216 specifies the number of view images as well as the orientation of those view images. The view synthesizer 277 may generate additional view images based on the multiview format label 216. For example, assume the target number of views is four views and the multiview format label 216 indicates that the multiview image is in a 2-by-1 format. In this example, the view synthesizer 277 may identify the specific locations of the original two views in the multiview image 204 and generate two additional view images to achieve the target number of view images. Thus, in this example, the render pipeline 276 converts a 2-by-1 formatted multiview image into a four view multiview image by synthesizing two additional view images from the two original view images present in the 2-by-1 formatted multiview image. The render pipeline 276 determines the coordinates or location of the two original view images within the tiled multiview image by using the multiview format label 216 to determine that the multiview image is a 2-by-1 formatted multiview image. By knowing the multiview format, the original view images may be located and separated to then synthesize new view images.

In some embodiments, the view synthesizer 277 may be bypassed if the multiview format label 216 indicates that no view images are needed to be synthesized. For example, if the target number of views is four and the multiview format label 216 indicates that that multiview image has four views in a particular orientation (e.g., a quad orientation), then no view synthesis is needed. In some embodiments, if the multiview format label 216 indicates that there are more view images in the multiview image 204 than what is supported by the multiview display system, view images may be removed to achieve the target number of view images supported by the multiview display system.

Thus, the multiview format label 216 may be used to identify the location of the view images as well as used to determine whether additional views need to be synthesized or whether original view images need to be removed to achieve a target number of views. Once the view images are identified (and potentially new view images are synthesized) based on the multiview format label, the interlacer 278 generates an interlaced multiview image 279.

The interlacer 278 (e.g., an interlacing program) that performs the rendering may receive the multiview image 204 and any synthesized views to generate the interlaced multiview image 279 as an output. The interlaced multiview image 279 may be loaded into a graphics memory buffer or otherwise painted onto a multiview display 112. The interlacing program may format the interlaced multiview image 279 according to a format that is specific and native to the multiview display 112. In some embodiments, this involves interlacing pixels of each view mage to collocate the pixels of various views based on their corresponding locations. For example, the upper left-most pixel of each view image may be collocated when generating the interlaced multiview image 279. In other words, the pixels of each view image are spatially multiplexed or otherwise interlaced to generate the interlaced multiview image 279. The multiview format label 216 allows the render pipeline 276 to identify the location of the view images. For example, knowing the multiview format, the render pipeline 276 can determine the location of each pixel of each tile (e.g., view image). In other words, knowing the multiview format, the render pipeline 276 can identify the beginning and ending pixels of each view image within the multiview image 204. In this example, the multiview display system presents four views (e.g., view 1, view 2, view 3, and view 4). The multiview format label 216 indicates the location of these view images as well as whether new view images need to be synthesized.

As shown in FIG. 8, the interlaced multiview image 279 has views that are spatially multiplexed or otherwise interlaced. FIG. 8 shows pixels that correspond to one of four views, where the pixels are interlaced (e.g., interleaved or spatially multiplexed). Pixels belonging to view 1 are represented by the number 1, pixels belonging to view 2 are represented by the number 2, pixels belonging to view 3 are represented by the number 3, and pixels belonging to view 4 are represented by the number 4. The views of the interlaced multiview image 279 are interlaced on a pixel-by-pixel basis, horizontally along each row. The interlaced multiview image 279 has rows of pixels represented by uppercase letters A-E and columns of pixels represented by lowercase letters a-h. FIG. 8 shows the location of one of the multiview pixels 282 at row E, columns e-h. The multiview pixel 282 is an arrangement of pixels taken from pixels of each of the four views. In other words, the multiview pixel 282 is a result of interlacing the individual pixels of each of the four views so that they are spatially multiplexed. While FIG. 8 shows interlacing the pixels of the different views in the horizontal direction, the pixels of the different views may be interlaced in the vertical direction as well as in both the horizontal and vertical directions.

The interlaced multiview image 279 may result in a multiview pixel 282 having one pixel from each of the four views, assuming that the target number of views is four. As mentioned above, the multiview format label allows the render pipeline 276 to locate corresponding pixels of each view image. In some embodiments, multiview pixels may be staggered in a particular direction, as shown in FIG. 8, where the multiview pixels are aligned horizontally while being staggered vertically. In other embodiments, the multiview pixels may be staggered horizontally and aligned vertically. A particular manner in which the multiview pixels are interlaced and staggered may depend on the design of the multiview display 112. The interlaced multiview image 279 may interlace pixels and arrange its pixels into multiview pixels to allow them to be mapped to the physical pixels (e.g., light valve array 284) of the multiview display 112. In other words, the pixel coordinates of the interlaced multiview image 279 correspond to physical locations of the multiview display 112. The multiview pixel 282 has a mapping 287 to a specific set of light valves in the light valve array 284. The light valve array 284 is controlled to modulate light according to the interlaced multiview image 279.

Figure 9:
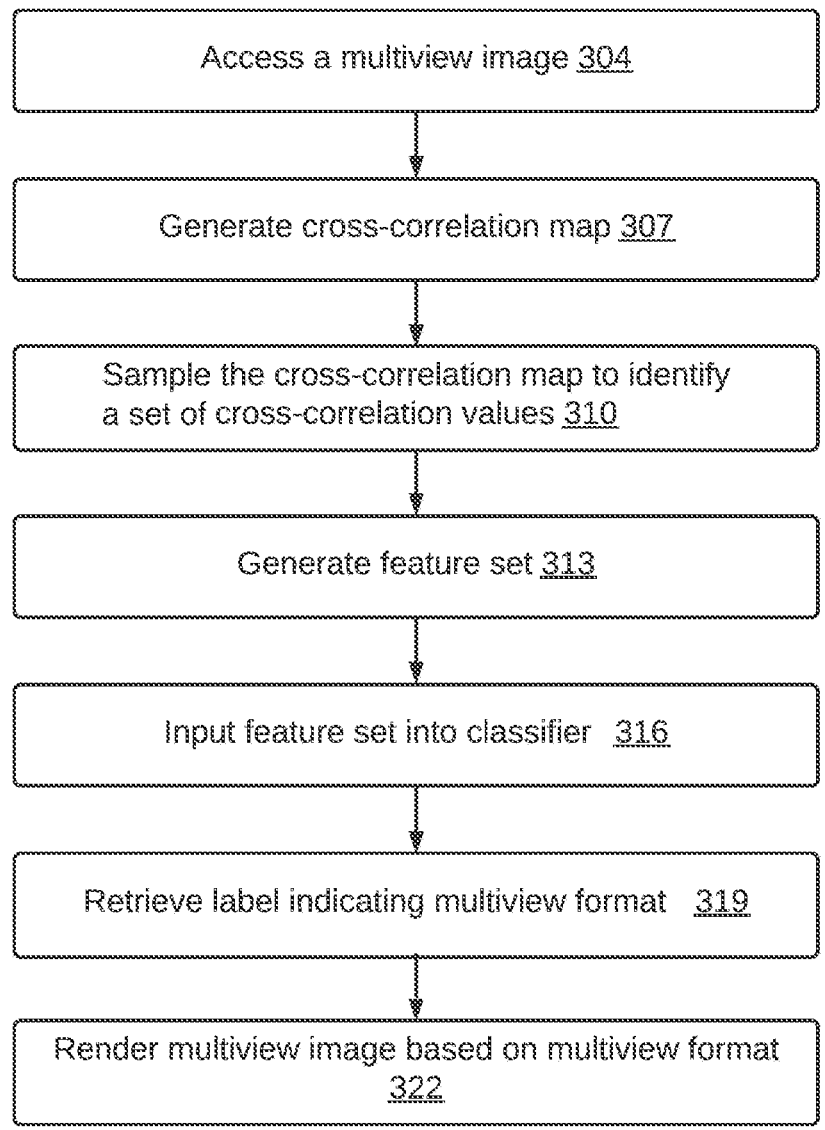
FIG. 9 is a flowchart that provides an example of the functionality of a multiview display system that is configured to detect multiview formats, according to an embodiment consistent with the principles described herein.

FIG. 9 is a flowchart that provides an example of the functionality of a multiview display system that is configured to detect multiview formats, according to an embodiment consistent with the principles described herein. The flowchart of FIG. 9 provides one example of the different types of functionality implemented by a computing device (e.g., a multiview display system of FIG. 10) executing an instruction set. For example, the multiview display system may include a multiview display configured to display multiview images (e.g., the multiview display 112). The multiview display system may further include a processor and a memory that stores a plurality of instructions, which, when executed by the processor, cause the processor to perform various operations shown in the flowchart. As an alternative, the flowchart of FIG. 9 may be viewed as depicting an example of steps of a method implemented in a computing device according to one or more embodiments. FIG. 9 may also represent a computer program, such as a computer program on a transitory or non-transitory, computer-readable storage medium storing executable instructions that, when executed by a processor of a computer system, perform operations of multiview format detection. An example of the computer system may be a multiview display system discussed below with respect to FIG. 8. These operations are shown in the flowchart.

Instructions may be executed to cause a processor to access 304 a multiview image comprising a plurality of tiled view images. For example, the multiview image may be accessed by a multiview format detector. The multiview format detector may be a software module or routine configured to detect the multiview format of multiview images. The multiview image may be accessed from a memory location or otherwise provided to the multiview format detector by an application that is configured to render the multiview image. The application may invoke or otherwise contain the multiview format detector for classifying multiview images based on their multiview format.

Instructions may be executed to cause a processor to generate 307 a cross-correlation map from the multiview image by autocorrelating the multiview image with a shifted copy of the multiview image. The shifted copy may be replicated from the multiview image so that it is identical to the multiview image. The shifted copy is shifted across the multiview image to calculate cross-correlation values. The cross-correlation values are stored as a cross-correlation map. The cross-correlation map may be a two-dimensional array of elements, where each element has a cross-correlation value and a position (e.g., coordinates) within the cross-correlation map. The position of the element corresponds to the location of the shifted copy relative to the multiview image. Thus, the size of the cross-correlation map may be larger than the multiview image as the shifted copy slides from the upper corner of the multiview image to the lower corner of the multiview image.

Instructions may be executed to cause a processor to sample 310 the cross-correlation map at a plurality of predefined locations of the cross-correlation map to identify a set of cross-correlation values. The predefined locations may be specified as coordinates or coordinate ranges within the cross-correlation map. The predefined locations may be a corner region, a midpoint along the length of the cross-correlation map, a midpoint along the height of the cross-correlation map, the center of the cross-correlation map, or other predefined locations. The predefined locations correspond to locations where hotspots would likely appear based on the arrangement of tiled view images.

Instructions may be executed to cause a processor to generate 313 a feature set. In some embodiments, when generating the feature set, the instructions may cause the processor to determine an aspect ratio of the multiview image, wherein the feature set further comprises the aspect ratio. The feature set may include individual features extracted from the multiview image.

Instructions may be executed to cause a processor to input 316 a feature set of the multiview image into a classifier, the feature set comprising the set of cross-correlation values. For example, the feature set includes an array of sampled cross-correlation values. The feature set is inputted (e.g., passed) to a trained classifier that is configured to generate a label. The label may include a list of potential multiview formats with corresponding probabilities that the inputted feature set is of a particular multiview format. The label may identify the multiview format having the highest probability based on the inputted feature set. Prior to runtime of the classifier, embodiments are directed to training the classifier to classify the feature set using training data, wherein the training data comprises a training set of multiview images and corresponding training labels.

Instructions may be executed to cause a processor to retrieve 319 a label from the classifier, the label indicating a multiview format of the multiview image. The label may be sent to the application that is responsible for rendering the multiview image. The label may indicate that the multiview format is a 1-by-2 tile format, a 2-by-1 tile format, or a 2-by-2 tile format. In some embodiments, the label may indicate when the multiview image is not a true multiview image such that it is in a single tile format.

Instructions may be executed to cause a processor to render 322 the multiview image on a multiview display based on the multiview format. In this respect, the multiview image is configured to be rendered on a multiview display based on the multiview format. Rendering may be performed by a render pipeline. Rendering the multiview image may include operations of interlacing the pixels of the tiled view images of the multiview image upon detecting the multiview format. For example, knowing the multiview format allows the render pipeline to locate the individual view images of the multiview image and determine whether new view images need to be synthesized to achieve a target number of views. Once locating the view images and potentially synthesizing new view images, an interlacer may interlace the view images whether they are originally part of the multiview image or newly synthesized. Thus, the application may use the label to instruct a render pipeline to render the multiview image.

The flowchart of FIG. 9 discussed above may illustrate a system or method of multiview format detection and the implementation of an executable instruction set. If embodied in software, each box may represent a module, segment, or portion of code that comprises instructions to implement the specified logical function(s). The instructions may be embodied in the form of source code that comprises human-readable statements written in a programming language, object code that is compiled from source code, or machine code that comprises numerical instructions recognizable by a suitable execution system, such as a processor a computing device. The machine code may be converted from the source code, etc. If embodied in hardware, each block may represent a circuit or a number of interconnected circuits to implement the specified logical function(s).

Although the flowchart of FIG. 9 shows a specific order of execution, it is understood that the order of execution may differ from that which is depicted. For example, the order of execution of two or more boxes may be scrambled relative to the order shown. Also, two or more boxes shown may be executed concurrently or with partial concurrence. Further, in some embodiments, one or more of the boxes may be skipped or omitted.

Figure 10:
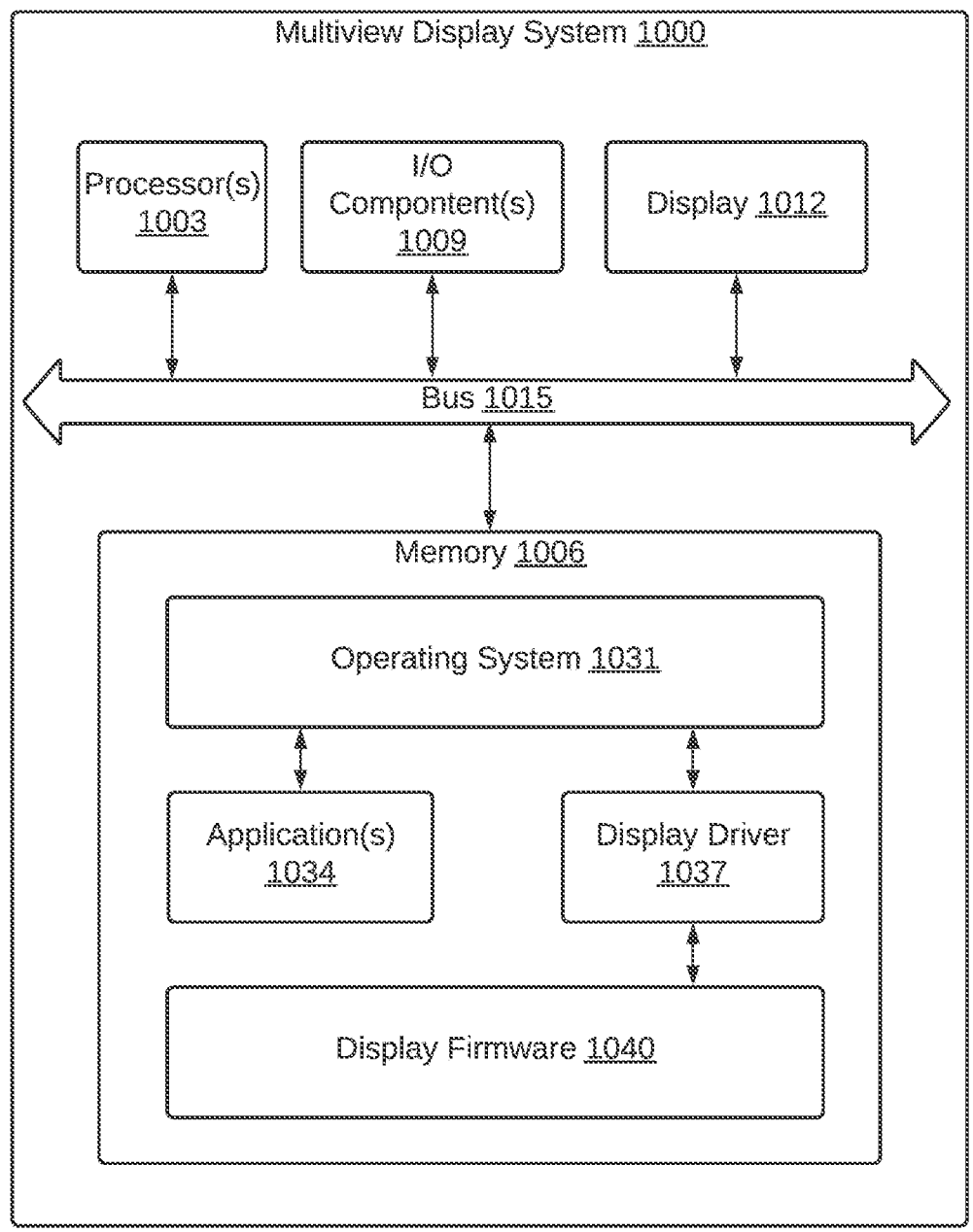
FIG. 10 is a schematic block diagram that depicts an example illustration of a multiview display system according to an embodiment consistent with the principles described herein.

FIG. 10 is a schematic block diagram that depicts an example illustration of a multiview display system according to an embodiment consistent with the principles described herein. The multiview display system 1000 may include a system of components that carry out various computing operations that detect multiview formats of multiview images. The multiview display system 1000 may be a laptop, tablet, smart phone, touch screen system, intelligent display system, or other client device. The multiview display system 1000 may include various components such as, for example, a processor(s) 1003, a memory 1006, input/output (I/O) component(s) 1009, a display 1012, and potentially other components. These components may couple to a bus 1015 that serves as a local interface to allow the components of the multiview display system 1000 to communicate with each other. While the components of the multiview display system 1000 are shown to be contained within the multiview display system 1000, it should be appreciated that at least some of the components may couple to the multiview display system 1000 through an external connection. For example, components may externally plug into or otherwise connect with the multiview display system 1000 via external ports, sockets, plugs, wireless links, or connectors.

A processor 1003 may be a central processing unit (CPU), graphics processing unit (GPU), any other integrated circuit that performs computing processing operations, or any combination thereof. The processor(s) 1003 may include one or more processing cores. The processor(s) 1003 comprises circuitry that executes instructions. Instructions include, for example, computer code, programs, logic, or other machine-readable instructions that are received and executed by the processor(s) 1003 to carry out computing functionality that are embodied in the instructions. The processor(s) 1003 may execute instructions to operate on data. For example, the processor(s) 1003 may receive input data (e.g., an image or frame), process the input data according to an instruction set, and generate output data (e.g., a processed image or frame). As another example, the processor(s) 1003 may receive instructions and generate new instructions for subsequent execution. The processor 1003 may comprise the hardware to implement a graphics pipeline for processing and rendering lightfield content. For example, the processor(s) 1003 may comprise one or more GPU cores, vector processors, scaler processes, or hardware accelerators.

The memory 1006 may include one or more memory components. The memory 1006 is defined herein as including either or both of volatile and nonvolatile memory. Volatile memory components are those that do not retain information upon loss of power. Volatile memory may include, for example, random access memory (RAM), static random access memory (SRAM), dynamic random access memory (DRAM), magnetic random access memory (MRAM), or other volatile memory structures. System memory (e.g., main memory, cache, etc.) may be implemented using volatile memory. System memory refers to fast memory that may temporarily store data or instructions for quick read and write access to assist the processor(s) 1003.

Nonvolatile memory components are those that retain information upon a loss of power. Nonvolatile memory includes read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive. The ROM may comprise, for example, a programmable read-only memory (PROM), an erasable programmable read-only memory (EPROM), an electrically erasable programmable read-only memory (EEPROM), or other like memory device. Storage memory may be implemented using nonvolatile memory to provide long term retention of data and instructions.

The memory 1006 may refer to the combination of volatile and nonvolatile memory used to store instructions as well as data. For example, data and instructions may be stored in nonvolatile memory and loaded into volatile memory for processing by the processor(s) 1003. The execution of instructions may include, for example, a compiled program that is translated into machine code in a format that can be loaded from nonvolatile memory into volatile memory and then run by the processor 1003, source code that is converted in suitable format such as object code that is capable of being loaded into volatile memory for execution by the processor 1003, or source code that is interpreted by another executable program to generate instructions in volatile memory and executed by the processor 1003, etc. Instructions may be stored or loaded in any portion or component of the memory 1006 including, for example, RAM, ROM, system memory, storage, or any combination thereof.

While the memory 1006 is shown as being separate from other components of the multiview display system 1000, it should be appreciated that the memory 1006 may be embedded or otherwise integrated, at least partially, into one or more components. For example, the processor(s) 1003 may include onboard memory registers or cache to perform processing operations. Device firmware or drivers may include instructions stored in dedicated memory devices.

I/O component(s) 1009 include, for example, touch screens, speakers, microphones, buttons, switches, dials, camera, sensors, accelerometers, or other components that receive user input or generate output directed to the user. I/O component(s) 1009 may receive user input and convert it into data for storage in the memory 1006 or for processing by the processor(s) 1003. I/O component(s) 1009 may receive data outputted by the memory 1006 or processor(s) 1003 and convert them into a format that is perceived by the user (e.g., sound, tactile responses, visual information, etc.).

A specific type of I/O component 1009 is a display 1012. The display 1012 may include a multiview display (e.g., multiview display 112), a multiview display combined with a 2D display, or any other display that presents images. A capacitive touch screen layer serving as an I/O component 1009 may be layered within the display to allow a user to provide input while contemporaneously perceiving visual output. The processor(s) 1003 may generate data that is formatted as an image for presentation on the display 1012. The processor(s) 1003 may execute instructions to render the image on the display for being perceived by the user.

The bus 1015 facilitates communication of instructions and data between the processor(s) 1003, the memory 1006, the I/O component(s) 1009, the display 1012, and any other components of the multiview display system 1000. The bus 1015 may include address translators, address decoders, fabric, conductive traces, conductive wires, ports, plugs, sockets, and other connectors to allow for the communication of data and instructions.

The instructions within the memory 1006 may be embodied in various forms in a manner that implements at least a portion of the software stack. For example, the instructions may be embodied as part of an operating system 1031, an application(s) 1034, a device driver (e.g., a display driver 1037), firmware (e.g., display firmware 1040), other software components, or any combination thereof. The operating system 1031 is a software platform that supports the basic functions of the multiview display system 1000, such as scheduling tasks, controlling I/O components 1009, providing access to hardware resources, managing power, and supporting applications 1034.

An application(s) 1034 executes on the operating system 1031 and may gain access to hardware resources of the multiview display system 1000 via the operating system 1031. In this respect, the execution of the application(s) 1034 is controlled, at least in part, by the operating system 1031. The application(s) 1034 may be a user-level software program that provides high-level functions, services, and other functionality to the user. In some embodiments, an application 1034 may be a dedicated 'app' downloadable or otherwise accessible to the user on the multiview display system 1000. The user may launch the application(s) 1034 via a user interface provided by the operating system 1031. The application(s) 1034 may be developed by developers and defined in various source code formats. The applications 1034 may be developed using a number of programming or scripting languages such as, for example, C, C++, C #, Objective C, Java®, Swift, JavaScript®, Perl, PUP, Visual Basic®, Python®, Ruby, Go, or other programming languages. The application(s) 1034 may be compiled by a compiler into object code or interpreted by an interpreter for execution by the processor(s) 1003. The application 1034 may be the application 207 discussed above with respect to FIG. 3.

Device drivers such as, for example, the display driver 1037, include instructions that allow the operating system 1031 to communicate with various I/O components 1009. Each I/O component 1009 may have its own device driver. Device drivers may be installed such that they are stored in storage and loaded into system memory. For example, upon installation, a display driver 1037 translates a high-level display instruction received from the operating system 1031 into lower level instructions implemented by the display 1012 to display an image.

Firmware, such as, for example, display firmware 1040, may include machine code or assembly code that allows an I/O component 1009 or display 1012 to perform low-level operations. Firmware may convert electrical signals of particular component into higher level instructions or data. For example, display firmware 1040 may control how a display 1012 activates individual pixels at a low level by adjusting voltage or current signals. Firmware may be stored in nonvolatile memory and executed directly from nonvolatile memory. For example, the display firmware 1040 may be embodied in a ROM chip coupled to the display 1012 such that the ROM chip is separate from other storage and system memory of the multiview display system 1000. The display 1012 may include processing circuitry for executing the display firmware 1040.

The operating system 1031, application(s) 1034, drivers (e.g., display driver 1037), firmware (e.g., display firmware 1040), and potentially other instruction sets may each comprise instructions that are executable by the processor(s) 1003 or other processing circuitry of the multiview display system 1000 to carry out the functionality and operations discussed above. Although the instructions described herein may be embodied in software or code executed by the processor(s) 1003 as discussed above, as an alternative, the instructions may also be embodied in dedicated hardware or a combination of software and dedicated hardware. For example, the functionality and operations carried out by the instructions discussed above may be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc.

In some embodiments, the instructions that carry out the functionality and operations discussed above may be embodied in a non-transitory, computer-readable storage medium. The non-transitory, computer-readable storage medium may or may not be part of the multiview display system 1000. The instructions may include, for example, statements, code, or declarations that can be fetched from the computer-readable medium and executed by processing circuitry (e.g., the processor(s) 1003). Has defined herein, a 'non-transitory, computer-readable storage medium' is defined as any medium that can contain, store, or maintain the instructions described herein for use by or in connection with an instruction execution system, such as, for example, the multiview display system 1000, and further excludes transitory medium including, for example, carrier waves.

The non-transitory, computer-readable medium may comprise any one of many physical media such as, for example, magnetic, optical, or semiconductor media. More specific examples of a suitable non-transitory, computer-readable medium may include, but are not limited to, magnetic tapes, magnetic floppy diskettes, magnetic hard drives, memory cards, solid-state drives, USB flash drives, or optical discs. Also, the non-transitory, computer-readable medium may be a random access memory (RAM) including, for example, static random access memory (SRAM) and dynamic random access memory (DRAM), or magnetic random access memory (MRAM). In addition, the non-transitory, computer-readable medium may be a read-only memory (ROM), a programmable read-only memory (PROM), an erasable programmable read-only memory (EPROM), an electrically erasable programmable read-only memory (EEPROM), or other type of memory device.

The multiview display system 1000 may perform any of the operations or implement the functionality described above. For example, the process flows discussed above may be performed by the multiview display system 1000 that executes instructions and processes data. While the multiview display system 1000 is shown as a single device, embodiments are not so limited. In some embodiments, the multiview display system 1000 may offload processing of instructions in a distributed manner such that a plurality of multiview display systems 1000 or other computing devices operate together to execute instructions that may be stored or loaded in a distributed arranged. For example, at least some instructions or data may be stored, loaded, or executed in a cloud-based system that operates in conjunction with the multiview display system 1000.

Thus, there have been described examples and embodiments of detecting the multiview format of a multiview image. Operations include the generation of a feature based on performing an auto-correlation on the multiview image and sampling specific locations of the cross-correlation map. A classifier is trained based on at least this feature to detect multiview formats. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A computer-implemented method of multiview format detection, the method comprising:
   accessing a multiview image comprising a plurality of tiled view images;
   generating a cross-correlation map from the multiview image by autocorrelating the multiview image with a shifted copy of the multiview image;
   sampling the cross-correlation map at a plurality of predefined locations of the cross-correlation map to identify a set of cross-correlation values; and
   detecting a multiview format of the multiview image by classifying a feature set of the multiview image that comprises the set of cross-correlation values,
   wherein the multiview image is configured to be rendered on a multiview display based on the multiview format.

2. The computer-implemented method of multiview format detection of claim 1, further comprising:
   determining an aspect ratio of the multiview image, wherein the feature set further comprises the aspect ratio.

3. The computer-implemented method of multiview format detection of claim 1, wherein at least one of the predefined locations comprises a corner region of the cross-correlation map.

4. The computer-implemented method of multiview format detection of claim 1, wherein at least one of the predefined locations comprises a midpoint along one of a length and a width of the cross-correlation map.

5. The computer-implemented method of multiview format detection of claim 1, wherein each cross-correlation value of the set of cross-correlation values is determined based on a single cross-correlation value.

6. The computer-implemented method of multiview format detection of claim 1, wherein each cross-correlation value of the set of cross-correlation values is determined by averaging values within a corresponding predefined location.

7. The computer-implemented method of multiview format detection of claim 1, further comprising:
training a classifier to classify the feature set according to training data, wherein the training data comprises a training set of multiview images and corresponding training labels.

8. The computer-implemented method of multiview format detection of claim 7, wherein the training labels comprise labels indicating a single tile format, a 1-by-2 tile format, a 2-by-1 tile format, and a 2-by-2 tile format.

9. The computer-implemented method of multiview format detection of claim 1, wherein the multiview display is configured to provide a broad-angle emitted light during a two-dimensional (2D) mode using a broad-angle backlight; and
wherein the multiview display is configured to provide a directional emitted light during a multiview mode using a multiview backlight having an array of multi beam elements, the directional emitted light comprising a plurality of directional light beams provided by each multi beam element of the multi beam element array; and
wherein the multiview display is configured to time multiplex the 2D mode and the multiview mode using a mode controller to sequentially activate the broad-angle backlight during a first sequential time interval corresponding to the 2D mode and the multiview backlight during a second sequential time interval corresponding to the multiview mode; and
wherein directions of the directional light beams correspond to different view directions of the multiview image.

10. The computer-implemented method of multiview format detection of claim 1, wherein the multiview display is configured to guide light in a light guide as guided light; and
wherein the multiview display is configured to scatter out a portion of the guided light as directional emitted light using multibeam elements of a multibeam element array, each multibeam element of the multibeam element array comprising one or more of a diffraction grating, a micro-refractive element, and a micro-reflective element.

11. A multiview display system comprising:
a multiview display configured to display multiview images;
a processor; and
a memory that stores a plurality of instructions that, when executed, cause the processor to:
access a multiview image comprising a plurality of tiled view images;
generate a cross-correlation map from the multiview image by autocorrelating the multiview image with a shifted copy of the multiview image;
sample the cross-correlation map at a plurality of predefined locations of the cross-correlation map to identify a set of cross-correlation values;
input a feature set of the multiview image into a classifier, the feature set comprising the set of cross-correlation values;
retrieve a label from the classifier, the label indicating a multiview format of the multiview image; and
render the multiview image on a multiview display based on the multiview format.

12. The multiview display system of claim 11, wherein the plurality of instructions, when executed, further cause the processor to:
determine an aspect ratio of the multiview image, wherein the feature set further comprises the aspect ratio.

13. The multiview display system of claim 11, wherein at least one of the predefined locations comprises a corner region of the cross-correlation map.

14. The multiview display system of claim 11, wherein at least one of the predefined locations comprises a midpoint along one of a length and a width of the cross-correlation map.

15. The multiview display system of claim 11, wherein each cross-correlation value of the set of cross-correlation values is determined based on a single cross-correlation value.

16. The multiview display system of claim 11, wherein the classifier is trained using training data, wherein the training data comprises a training set of multiview images and corresponding training labels.

17. The multiview display system of claim 16, wherein the training labels comprise labels indicating a single tile format, a 1-by-2 tile format, and a 2-by-1 tile format.

18. A computer program comprising executable instructions that, when executed by a processor of a computer system, perform operations of multiview format detection, the operations comprising:
accessing a multiview image comprising a plurality of tiled view images;
generating a cross-correlation map from the multiview image by autocorrelating the multiview image with a shifted copy of the multiview image;
sampling the cross-correlation map at a plurality of predefined locations of the cross-correlation map to identify a set of cross-correlation values;
detecting a multiview format of the multiview image by classifying a feature set of the multiview image that comprises the set of cross-correlation values; and
interlacing pixels of the tiled view images of the multiview image upon detecting the multiview format.

19. The computer program of claim 18, wherein the operations further comprise:
determining an aspect ratio of the multiview image, wherein the feature set further comprises the aspect ratio.

20. The computer program of claim 18, wherein the multiview format is a 1-by-2 tile format, a 2-by-1 tile format, or a 2-by-2 tile format.

* * * * *